Sept. 29, 1970  R. E. RICHARDSON  3,531,276

PRESS BENDING APPARATUS WITH THIN RIGID PRESSING PLATES

Filed Sept. 12, 1967  2 Sheets-Sheet 1

INVENTOR
RONALD E. RICHARDSON
BY Cushman, Darby & Cushman
ATTORNEYS

Sept. 29, 1970    R. E. RICHARDSON    3,531,276
PRESS BENDING APPARATUS WITH THIN RIGID PRESSING PLATES
Filed Sept. 12, 1967    2 Sheets-Sheet 2

INVENTOR
RONALD E. RICHARDSON

BY Cushman, Darby & Cushman
ATTORNEYS

United States Patent Office 3,531,276
Patented Sept. 29, 1970

3,531,276
PRESS BENDING APPARATUS WITH THIN RIGID PRESSING PLATES
Ronald E. Richardson, Oshawa, Ontario, Canada, assignor to PPG Industries, Inc., Pittsburgh, Pa., a corporation of Pennsylvania
Filed Sept. 12, 1967, Ser. No. 667,151
Claims priority, application Canada, June 16, 1967, 993,157
Int. Cl. C03b 23/02
U.S. Cl. 65—287      9 Claims

ABSTRACT OF THE DISCLOSURE

A glass shaping member for use in an apparatus for press bending heat softened glass sheets between a pair of such shaping members; each said shaping member includes a relatively thin but rigid shaping plate having a predetermined surface contour corresponding to that desired for the bent glass sheet, with each of the sections thereof having a maximum dimension of approximately 2 feet. The margins of each section of the shaping member are spaced a sufficient distance from the margins of other sections to permit thermal expansion of each section as a result of the temperatures reached during press bending. The shaping plate sections are supported on a relatively rigid planar grid and are held in spaced relation with respect to the latter by means of a plurality of elongated rods which connect spaced points on the shaping plate sections to the grid. These rods are so arranged and distributed throughout the extent of the rigid grid and the shaping plates that the latter are permitted to expand thermally without distorting from their desired local configurations while at the same time proper alignment between the grid and the shaping plates is maintained.

---

The present invention relates to apparatus for bending a heat softened glass sheet by sandwiching the glass sheet in pressurized engagement between a pair of glass shaping members having complementary shaping surfaces conforming substantially to the shape desired for the bent glass sheet and being relatively movable between a retracted position and a glass engaging position.

It is well known in the art to bend glass sheets and plates by supporting the sheet to be bent between a pair of glass shaping members while the glass is at a temperature sufficiently high to be deformed and subjecting the glass to pressurized contact between a pair of glass shaping members having complementary shaping surfaces conforming to the shape desired for the bent glass. In the past, the glass shaping members were of either solid metal or a refractory material.

The glass shaping members fabricated from solid material, particularly metal, are very costly as to fabricate. Solid glass shaping members generally require extensive and expensive finishing operations including grinding and polishing to produce a shaping surface within the required dimensional tolerances. Furthermore, the solid shaping members are extremely heavy and are accordingly very difficult and awkward to install on the press bending machine. By virtue of the excessive weight of the shaping members, the moving parts of the press bending apparatus, particularly the hydraulic cylinder and ram arrangement commonly used to advance or retract the glass shaping members, must be made sufficiently strong as to support the shaping members thereon. Furthermore, the energy required to rapidly open and close the press as required by the process is excessive.

It is known to form shaping plates for glass shaping members from a flat sheet of metal; however it has been found that difficulties arise if one attempts to form a unitary shaping plate from a single flat sheet of metal of a size sufficient to shape relatively large glass sheets such as would be used in an automobile back window. In making such large full size unitary shaping plates it has often been found necessary to hot form the shaping plates in order to avoid setting up residual stresses in the plate which would tend to warp the latter. As is well known, hot forming of metal plates is considerably more expensive and time consuming than cold forming. Attempts to cold form full size shaping plates have not been very successful due to excessive plate warpage caused by the residual stresses set up in the plate. It has been found that in the cold forming operation of full size plates of relatively large dimensions (length and/or width), it is necessary to utilize relatively thick plates, and after cold shaping the same, to compensate for the excessive warpage set up by the residual stresses by grinding the shaping surfaces of the plate to final shape. In many cases this has resulted in as much as ⅜ of an inch thickness of metal having to be removed from the plate by grinding, such extensive grinding greatly increasing the final cost of the shaping plate, and possibly in itself having a warp causing action. Furthermore, the final result is generally a plate of uneven thickness and thermal properties that may change in shape temporarily or permanently during use. Even the plate is of relatively uniform final thickness, shape changes are to be expected. Even normalizing such large plates does not remove the temporary thermal shape changes due to the extensive area of metal heated and expanded without means of relief.

It is a primary object of the present invention to provide apparatus for shaping glass sheets in a press bending operation that obviates to a large extent the above mentioned difficulties, is relatively inexpensive to fabricate, light in weight, but is at the same time capable of producing the bent glass sheets on a mass production basis within precise tolerances, regardless of thermal influences on the shaping members.

The apparatus as described hereinafter includes complementary glass shaping members each having shaping plates of configuration and outline chosen to complete the shape of glass to be fabricated.

In order to obviate the difficulties inherent in the use of full size unitary shaping plates, the apparatus of the present invention utilizes sectionalized shaping plates. Associated with each of the shaping plates and spaced therefrom is a relatively rigid skeletonized grid. Means are provided for connecting the shaping plates to the relatively rigid skeletonized grid and for holding them in spaced relationship to one another. The attachment means is constructed and arranged and so distributed throughout the extent of the skeletonized grid and the shaping plates that the latter are permitted to expand thermally without distorting from their desired local configurations while at the same time maintaining proper alignment between the grid work and the shaping plates.

In the preferred form of the invention the shaping plates are comprised of a plurality of rigid sections, each shaped to conform to a different portion of a shaping surface. The several sections are spaced from one another at the marginal portions thereof at room temperature by a sufficient distance to permit the sections to expand towards one another without buckling from abutting force between said sections at their glass shaping temperature.

The shaping plate sections are connected to a unitary, relatively rigid grid and held in spaced relationship therewith by means of a plurality of elongated rods arranged such that certain of them may flex in response to thermal expansion of the shaping plate sections while at the same time maintaining proper alignment between the central portion of each shaping section and the grid.

Each section of the shaping plate is preferably of dimensions no greater than two feet long by two feet wide. This figure could vary somewhat but will serve to give those skilled in the art some idea of the maximum dimensions involved.

The shaping members of the present invention are fabricated firstly by shaping each of the sections of the shaping plate to the desired configuration by a cold forming method. After the sections have been cold formed they are attached to the skeletonized backing grid by means of a plurality of elongated rods, the latter being attached to the plate section and to the grid at spaced points in such a manner as to provide the required amount of structural rigidity. The rods are preferably attached to the sections of the shaping plates by threading the ends of the rods and securing the same within correspondingly threaded spaced apertures in the shaping plate sections. The ends of the rods distant from the shaping plate sections are then spot welded to suitable points on the skeletonized grid. After the welding has been completed, the glass engaging surface of the shaping plate is ground as required thereby to remove any high spots thereon and to achieve the final shaping surface configuration.

As will be more fully described hereinafter, the skeletonized grid is secured to a mounting plate, the latter serving as an attachment means for connection of the shaping member to a plate affixed to the ram of a hydraulic cylinder, the latter serving to move the shaping member from a retracted position to an advanced glass engaging position.

In order to understand fully the present invention, a description of a particular embodiment thereof will now be described.

In the drawings which form part of the description of this embodiment of the invention and wherein like reference numerals refer to like structural elements;

Figure 5:
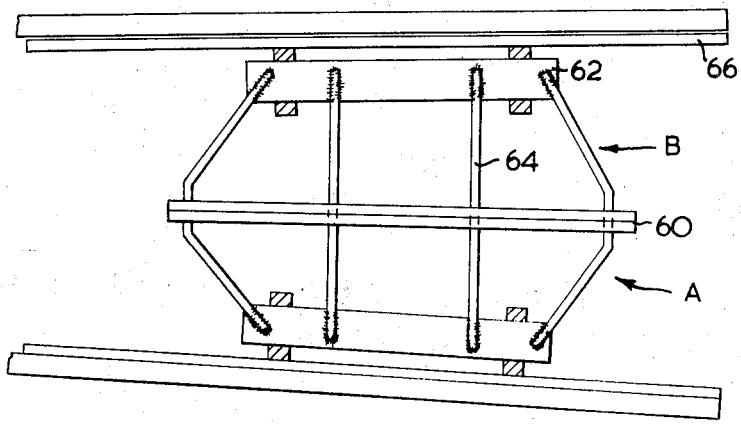

FIG. 5 is an elevation view in section taken along the axis of symmetry of a pair of complementary shaping members and illustrating the shaping plates in mating engagement with one another and connected via suitable rod means to skeletonized grid means associated with each of the shaping plates, each of the latter being connected via suitable mounting plate means to the hydraulic ram members of a glass shaping apparatus.

Figure 1:
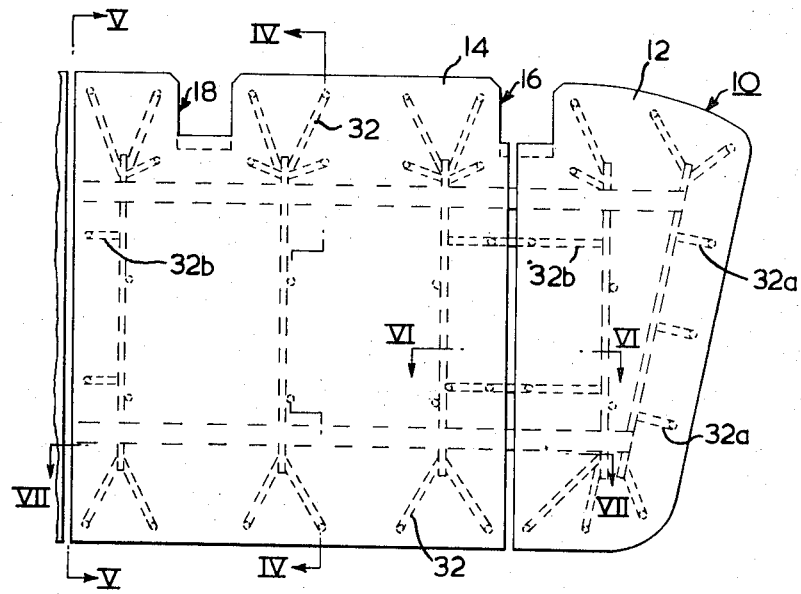
FIG. 1 is a plan view of one half of a symmetrical shaping member wherein the skeletonized backing grid and the rod elements connecting the latter to the shaping surface are shown in dotted lines.
Figure 6:
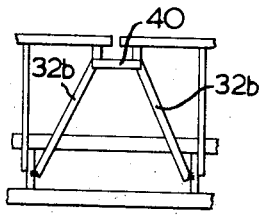

FIG. 6 is a fragmentary sectional view taken along the section line VI—VI in FIG. 1 and looking in the direction of the arrows.

Figure 7:
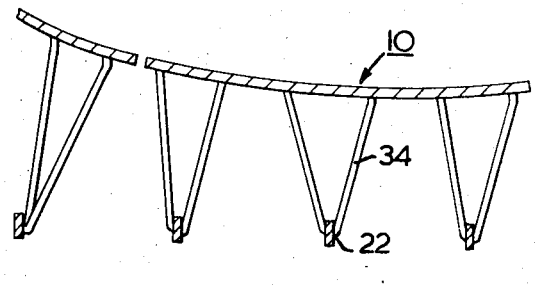

FIG. 7 is a fragmentary section view taken along section line VII—VII in FIG. 1 and looking in the direction of the arrows.

For convenience of illustration only one half of a shaping member is shown in FIG. 1. The shaping member illustrated here is symmetrical about the center line as indicated to the left of the figure. The shaping member includes a shaping plate broadly indicated at 10, the latter being subdivided into quarter section plates 12 and 14. The marginal edges of adjacent quarter section plates are spaced apart at room temperature by a distance sufficient to permit the section plates to expand freely towards one another without buckling as the section plates become heated during a press bending operation. The shaping plate sections 12 and 14 are, in the embodiment shown, of generally concave configuration and are adapted for use together with a further shaping member of convex configuration (not shown). The peripheral outline of the entire shaping plate 10 is chosen such that it conforms substantially to the outline shape of the glass sheet to be bent. The overall area of the shaping plate is sufficiently great as to provide contact with substantially the whole extent of one major surface of a glass sheet undergoing bending.

Situated in the upper edge of the shaping sections 12 and 14, are notches 16 and 18. These notches are of dimensions sufficient to accommodate tong means utilized to support the glass sheet in a vertical position during press bending as is well known in the art. The edges of the notches 16 and 18 are suitably bevelled and all the sharp corners removed thereby lessening the possibility of marring the surface of the bent glass sheet.

Figure 2:
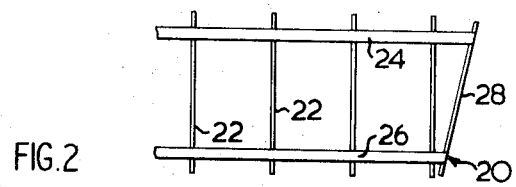
FIG. 2 is a plan view of a skeletonized grid adapted for securement to the rear face of a glass shaping plate.
Figure 3:
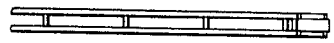
FIG. 3 is an elevation view of the skeletonized grid shown in FIG. 2.

Fixed to the rearward faces of the shaping plate sections 12 and 14 is a skeletonized grid assembly 20 shown in FIGS. 2 and 3. The grid 20 consists of a plurality of spaced parallel metal strips 22, the latter being held in assembled relationship by means of longitudinally extending pairs of bars 24 and 26. Each of the pairs of longitudinally extending bars 24 and 26 serve to sandwich the respective metal strips 22 therebetween a short distance inwardly of the opposed ends of the latter. That is, the opposed ends of strips 22 project a short distance outwardly on either side beyond the pairs of bars 24 and 26. Each of the strips 22 are preferably several times as deep as their thickness dimension, and they are assembled such that their depth dimensions are perpendicular to the longitudinal bars 24 and 26. The reinforcing grid 20 also includes an end strip 28, the latter being sandwiched between the pairs of longitudinally extending bars 24 and 26 in the same manner as described above with respect to strips 22. As with the glass shaping plate 10 described previously, the grid 20 is symmetrical about the center line shown in FIG. 2 but for convenience of illustration the left half of the grid is not shown.

The height and width dimensions of the grid 20 are less than the height and width dimensions of the shaping plate 10. This difference in the overall dimensions of the shaping plate and reinforcing grid is clearly illustrated in FIG. 1 wherein the reinforcing grid is shown in dotted lines, and lies well within the outer periphery of the shaping plate 10.

The shaping plate 10 is secured to the reinforcing grid 20 and held in spaced relationship therewith by means of a plurality of rods 30, the latter being secured each at one end to the shaping plate 10 and at the other end to the reinforcing grid 20.

The number of rods 30 used and the positions at which they intersect the shaping plate 10 must be carefully chosen. The number of rods 30 used must be sufficient to avoid buckling thereof during the press bending operation. The rods must be sufficiently rigid to prevent lateral displacement of the shaping plate 10 with respect to the reinforcing grids. Furthermore, the rods 30 must intersect with and be connected to shaping plate 10 at points which are sufficiently closely spaced to one another to prevent the shaping plate 10 from losing its desired configuration after a large number of press bending operations.

Figure 4:
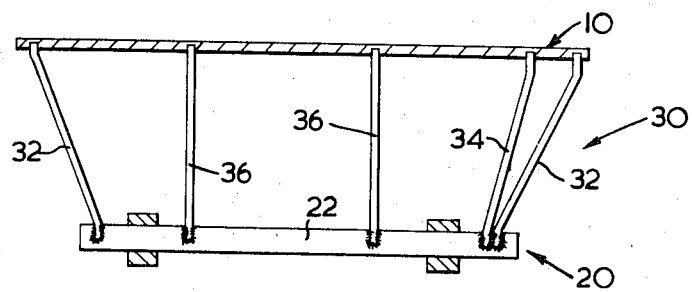
FIG. 4 is a section view taken along section IV—IV shown in FIG. 1 and looking in the direction of the arrows.

While several different configurations for the rods 30 are possible, for purposes of describing the present embodiment, the connecting rods 30 may be divided into three main groups. Firstly, there are the perimeter rods 32, 32a and 32b which connect the shaping plate 10 to the reinforcing grid 20 at a plurality of spaced points located just inwardly of the outer periphery of the several sections of the shaping plate 10. Secondly, there are provided a plurality of intermediate support rods 34, the latter serving to provide additional support for the shaping plate 10 along that marginal edge of the shaping plate wherein the tong recesses, i.e. notches 16 and 18, are provided. Finally, there are the interior support rods 36, the latter being disposed generally in the central portions of each shaping plate section. There types of support rod namely the perimeter rods 32, the intermediate rods 34, and the interior rods 36 are clearly illustrated at FIG. 4. Since the reinforcing grid 20 in the particular embodiment shown is of lesser dimensions than the shaping plate 10, the perimeter rods 32 form a relatively sharp angle with the plane of the grid 20 as they diverge outwardly and away from one another from the grid 20 to the shaping plate 10. Other embodiments wherein the grid has substantially the same outline dimensions as the shaping plate 10, thus obviating the need for disposing the perimeter rods angularly with respect to the grid, are possible. Since the intermediate rods 34 are connected to the shaping plate 10 at points which are spaced inwardly of the points of attachment of the perimeter rods 32, the angle which the several intermediate support rods 34 make with the plane of grid 20 is considerably greater, approaching 90°. The interior support rods 36 are disposed substantially normal to the plane of the grid 20.

All of the rods 30 are threaded at one end and secured in correspondingly threaded apertures in the shaping plate 10. The ends of the rods 30 remote from the threaded ends are secured to the reinforcing grid 20 preferably by welding the individual rods to the transversely extending metal strips 22 previously referred to. As may be clearly seen from either FIG. 1 or 4, both the perimeter rods 32 and the intermediate rods 34 are secured to the opposed end portions of the strips 22 which project outwardly and beyond the spaced pairs of longitudinally extending bars 24 and 26. The interior rods 36 on the other hand are secured to the section of the strips 22 which extends between said spaced pair of bars 24 and 26.

The perimeter rods 32 and the intermediate rods 34 are arranged such that complementary pairs of each are welded or otherwise suitably secured to opposing sides of the outwardly projecting end portions of the strips 22. This is clearly evident from FIG. 7 as well as from FIGS. 1 and 4.

The perimeter rods 32a and 32b are connected between the shaping plate sections and the skeletonized grid in a somewhat different manner as is evident from the drawings. The difference is particularly apparent in the end mold section 12. In the end mold section 12, the perimeter rods 32a adjacent and just inwardly of the extreme outer end of the shaping plate 10 are connected at spaced intervals along the entire length of the end rail 28. A further important set of perimeter rods 32b connects the interior marginal edge portions of the quarter section plates of the mold to the backing grid 20. As shown in dotted lines in FIG. 1, two perimeter rods 32b connect the intermediate portion of the perimeter of the quarter section plate 14 just inwardly of the line of symmetry of the shaping plate 10 to the intermediate portions of strip 22. In like manner, spaced points on the quarter section plates 12 and 14 are connected to the backing grid 20 by means of perimeter rods 32b and extend from the shaping plate 10 from spaced points located just inwardly of the adjacent, spaced apart edges of the quarter section plates 12 and 14. These latter mentioned rods are arranged in pairs and they are constructed and arranged such that they diverge outwardly and away from each other from the shaping plate to the reinforcing grid as most clearly shown in the sectional view of FIG. 6. The spaced pairs of rods 32b which lie in the same longitudinal plane and diverge away from each other, are connected together a short distance outwardly from the shaping plate by means of tie rods 40. These tie rods serve to prevent lateral sway of one quarter section plate with respect to the other.

Referring now to FIG. 5 there is shown in section a pair of complementary shaping members A and B constructed according to the present invention. This view shows the complementary shaping members A and B as they would normally be held in position in a shaping apparatus suitable for shaping vertically supported glass sheets. The shaping members A and B each include a suitably contoured shaping plate 60 connected to a backing grid 62 by means of connecting rods 64. The backing grid in turn is connected to a suitable mounting plate 66, the latter in turn being connected to the permanent face of the ram of the shaping machine.

The method of making the shaping members will now be briefly described. The quarter section plates of the mold are cut to the desired outline shape and are then cold formed as closely as possible to the final desired shape. The preferred maximum size of each of the quarter sections is two feet by two feet. The thickness of the plate used may vary considerably but practical experience has shown 3/8 inch steel plate to be very satisfactory. If the thickness is chosen greater than 3/8 inch the weight of the shaping member is increased considerably while a thickness of less than 3/8 inch leaves little material for final shaping by grinding. Furthermore plates less than 3/8 inch thick may not prove sufficiently rigid in use as to maintain the desired surface contour within required tolerances.

After the quarter section plates have been shaped by cold forming to the desired contour, holes are drilled into the rear face of the quarter section plate at the desired intervals and are thereafter tapped. The conncecting rods are then threaded at one end and turned into the tapped holes in the quarter section plates. The rods are thereafter bent into the appropriate shape and are then spot welded to the strips 22 of the grid 20 as previously described. After the quarter section plates have been connected to the reinforcing grid, the tie rods 40 previously referred to are welded in position thereby spanning the joints existing between the adjacent quarter plate sections thus preventing side sway of the latter with respect to each other.

After all of the welding has been completed the shaping surface is then ground to the final required shape. In actual practice is has been found, when using a sectionalized shaping plate as described above, that the amount of metal which must be removed by grinding is reduced to below 79/1000 inch as opposed to previous practice. As mentioned previously, when using multi section shaping plates having maximum dimensions not exceeding two feet by two feet, the residual stresses that are left in after cold forming are not troublesome. Accordingly, there is no need to stress relieve the shaping surfaces of the apparatus of the present invention after cold forming of the same and this represents a considerable reduction in the cost of fabricating the apparatus.

It is therefore seen that there has been provided a glass shaping member for use in a press bending operation which is inexpensive to fabricate, light in weight, and sufficiently rigid and durable for use in a mass production operation and little influenced by the thermal stresses formed by contact with the hot glass during pressing.

I claim:

1. In apparatus for bending a heat softened glass sheet by sandwiching the glass in pressurized engagement between a pair of glass shaping members, the improvement wherein at least one of the shaping members comprises; a relatively thin rigid shaping plate having a predetermined surface contour corresponding to that desired for the bent glass sheet with the overall area of the shaping plate being sufficiently large as to provide for contact of said shaping plate with substantially the entire extent of one major surface of a glass sheet undergoing bending, said shaping plate consisting of a plurality of sections, each of said sections having a maximum dimension of about 2 feet and having its margin spaced a sufficient distance from the margin of each other section adjacent thereto at room temperature to permit thermal expansion of said sections without warping the shaping plate due to stresses resulting from abutting force between said sections at elevated temperatures reached during press bending, a relatively rigid planar grid spaced from said shaping plate, means connecting spaced points on the rear faces of each of the shaping plate sections to said grid, said connecting means being constructed and arranged such that said shaping plate sections are free to expand and contract thermally without departing from said predetermined surface contour, said grid being constructed and arranged for attachment to further means for advancing and retracting said shaping member to and from glass engaging and glass disengaging positions respectively.

2. Apparatus according to claim 1 wherein said connecting means comprises a plurality of elongated rods connecting spaced points on the shaping plate sections to said grid.

3. Apparatus according to claim 2 wherein said grid is of lesser length and width dimensions than said shaping plate.

4. Apparatus according to claim 1 wherein said connecting means comprises a first group of elongated rods connecting spaced points adjacent the marginal edges of said shaping plate sections to preselected points on said grid, and a further group of rods connecting spaced points on said shaping plate interiorly of the marginal edges thereof to said grid.

5. Apparatus according to claim 4 further including tie rods connecting selected pairs of the rods of said first group together, the rods of each selected pair connecting points adjacent the spaced apart marginal edges of adjacent pairs of said shaping plate sections whereby said tie rods substantially eliminate lateral displacement of one shaping plate section with respect to the other.

6. Apparatus according to claim 1 wherein said grid comprises a plurality of pairs of elongated bars which extend in a direction parallel to the length dimension of said shaping member, and a plurality of spaced, parallel strips lying in a common plane and extending in a direction perpendicular to said elongated bars, the individual elongated bars of each said pair spaced from one another with said strips being interposed therebetween and securely affixed thereto at said spaced intervals.

7. Apparatus according to claim 3 wherein said connecting means comprises a first group of elongated rods connecting spaced points adjacent the marginal edges of said shaping plate sections to preselected points on said grid, and a further group of rods connecting spaced points on said shaping plate interiorly of the marginal edges thereof to said grid, a major portion at least of the first group of elongated rods are angularly disposed to the plane of said grid such that the rods of the first group associated with any one of said sections converge inwardly towards one another from the shaping plate to said grid.

8. Apparatus according to claim 7 wherein said further group of rods comprises second and third groups of rods, said third group of rods connecting spaced points on the central portions of the shaping plate sections to said grid and being disposed substantially normal to the latter, said second group of rods being disposed intermediate the rods of the first and third groups and being disposed at an angle to said grid which is greater than the angle which the first group of rods make with said grid but less than 90 degrees.

9. Apparatus according to claim 8 wherein said shaping plate has a plurality of notches formed in a marginal edge thereof to receive glass engaging tongs, and wherein said second group of rods connects spaced points on said shaping plate inwardly of said last-mentioned marginal edge to said grid thereby to provide additional support for the last-mentioned marginal edge.

References Cited
UNITED STATES PATENTS 3,256,080    6/1966    Vranken    65—275 X
3,421,875    1/1969    Kirkman    65—275 X ARTHUR D. KELLOGG, Primary Examiner U.S. Cl. X.R.
65—273, 275, 288